(12) United States Patent　　(10) Patent No.: US 8,805,943 B2
Gourevitch et al.　　(45) Date of Patent: Aug. 12, 2014

(54) OPTIMIZED ROUTING FOR PROXY USE

(75) Inventors: Gregory Gourevitch, Redmond, WA (US); Wilbert De Graaf, Bellevue, WA (US); David Blyth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 13/415,308

(22) Filed: Mar. 8, 2012

(65) Prior Publication Data

US 2013/0238719 A1　Sep. 12, 2013

(51) Int. Cl.
*G06F 15/16* (2006.01)

(52) U.S. Cl.
USPC .......................................... 709/206; 709/238

(58) Field of Classification Search
USPC .................................. 709/206, 238, 200, 224
IPC .................................................. H04L 29/06408
See application file for complete search history.

(56) References Cited

U.S. PATENT DOCUMENTS

| | | | |
|---|---|---|---|
| 2002/0169954 | A1 | 11/2002 | Bandini et al. |
| 2007/0073839 | A1* | 3/2007 | Chung et al. ................ 709/217 |
| 2010/0169424 | A1* | 7/2010 | Gustafsson et al. .......... 709/206 |
| 2010/0325215 | A1 | 12/2010 | de Souza et al. |
| 2013/0145032 | A1* | 6/2013 | Fawcett ........................ 709/226 |

OTHER PUBLICATIONS

"In-line Message Streaming At Network Perimeter Reduces Risk, Latency", Retrieved at <<http://www.mailscreen.eu/email-defense/in-line-message-streaming.html>>,Retrieved Date: Dec. 12, 2011, p. 1.
"Understanding Message Routing", Retrieved at <<http://technet.microsoft.com/en-us/library/aa998825.aspx>>, Retrieved Date : Dec. 12, 2011, pp. 23.
"SMTP Routing in Exchange 2010 (Part 2)", Retrieved at <<http://www.msexchange.org/articles_tutorials/exchange-server-2010/planning-architecture/smtp-routing-exchange-2010-part2.html>>, Retrieved Date : Dec. 12, 2011, pp. 12.
"Store & Forward/Disaster Recovery", Retrieved at <<http://mailroute.net/services.html>>, Retrieved Date: Dec. 12, 2011, p. 1.
"Extended Simple Mail Transfer Protocol (ESMTP) Accounting in Store and Forward Fax", Retrieved at <<http://www.cisco.com/en/US/docs/ios/12_0t/12_0t7/feature/guide/esmtp_a.pdf>>, Retrieved Date: Dec. 12, 2011, pp. 16.

* cited by examiner

*Primary Examiner* — El Hadji Sall
(74) *Attorney, Agent, or Firm* — Louise Bowman; Jim Ross; Micky Minhas

(57) ABSTRACT

A system is provided for applying optimized selection to route an email message over a network to a recipient mailbox. An email message may be enabled to be transmitted through a plurality of servers to a destination recipient mailbox server. An external message transfer agent may receive the email message using Simple Mail Transfer Protocol (SMTP) and may transmit the received email message to a proxy transport server. The proxy transport server may apply a selection for an optimal store-and-forward (SAF) transport server to which to route the email message. The selection may provide for identifying available SAF transport servers, organizing the SAF transport servers into server groups, and selecting the optimal SAF transport server belonging to a server group where a recipient mailbox server is located. The proxy transport server may transmit the email message to the SAF transport server for delivering the message to the recipient mailbox.

18 Claims, 6 Drawing Sheets

OPTIMIZED ROUTING FOR PROXY USE

BACKGROUND

In a networked environment, email may be routed from a sending client over the network to one or more destination recipient mailbox servers. Conventional email routing sometimes involves routing an email message through proxy transport servers using simple mail transfer protocol (SMTP). The proxy transport servers may perform connection filtering, email message filtering (e.g., scanning for spam and viruses), and load balancing on the email message before transmission to the next processing server. The proxy transport servers perform these actions while maintaining the open connection from the sender, which may partly contribute to the time limitation.

Typically, when routing email through proxy transport servers, an external mail transfer agent may transmit the email message to a proxy transport server, and there is a limited amount of time available for selecting a working target server and transmitting the email message to the target server before the external mail transfer agent times out its connection. This may result in a limited number of working target servers being selected, and often times the selected working target servers may be located far away from a destination mailbox server resulting in inefficient email transmission, and also may result in unreliable transport servers which may be vulnerable to network outages.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a system for applying an optimized selection to route an email message over a network to a recipient mailbox. The system may enable an email message to be transmitted through a plurality of servers to a destination recipient mailbox server. An external message transfer agent may receive the email message using SMTP and may transmit the received email message to a proxy transport server. The proxy transport server may apply a selection for an optimal store-and-forward (SAF) transport server to which to route the email message. The selection may provide for identifying available SAF transport servers, organizing the SAF transport servers into server groups, and selecting the optimal SAF transport server belonging to a server group where a recipient mailbox server is located. The proxy transport server may transmit the email message to the SAF transport server for delivering the message to the recipient mailbox.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
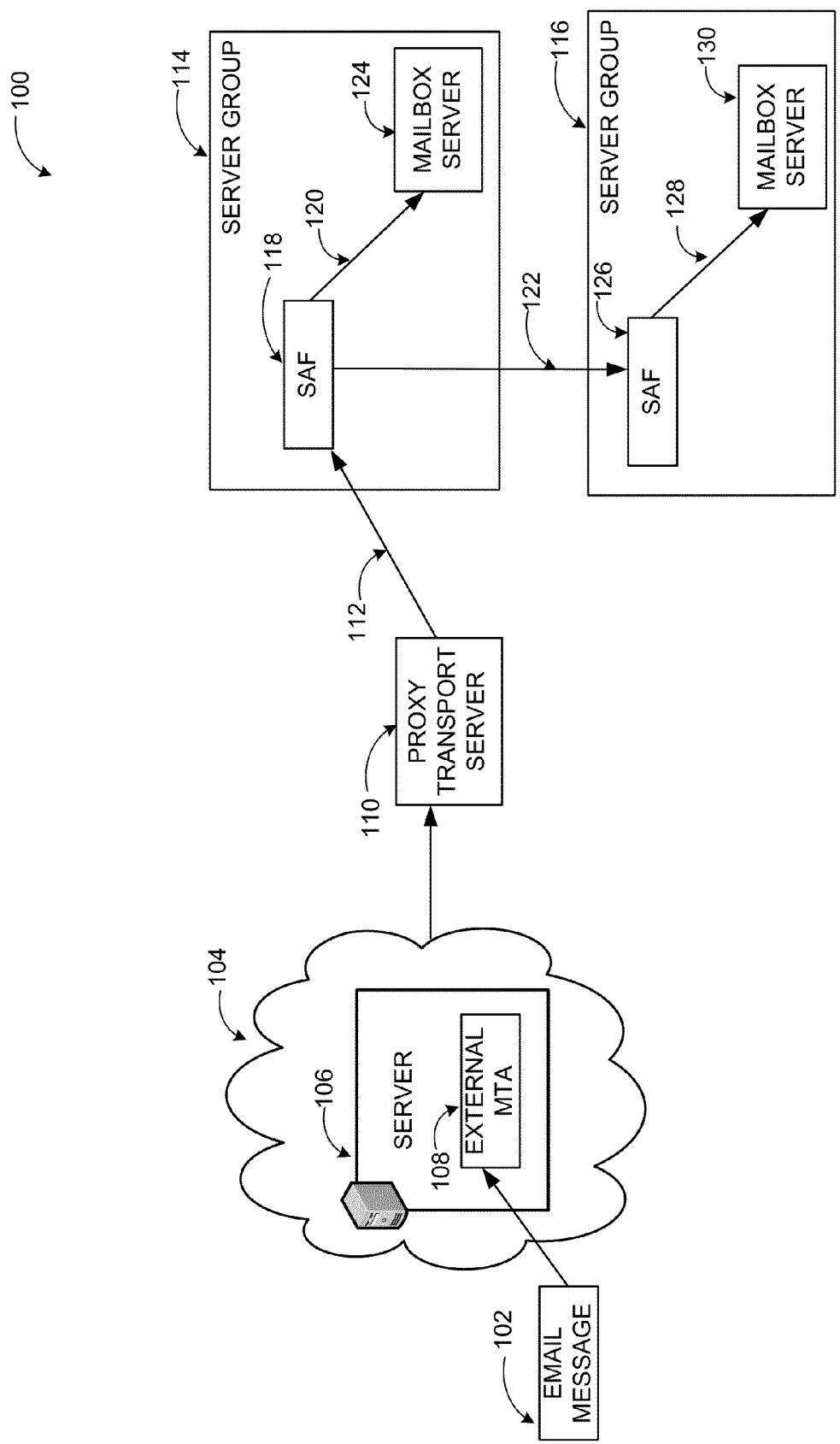
FIG. 1 illustrates a system for email routing over a network, according to embodiments.

As briefly described above, a system is provided for optimally selecting a store-and-forward transport server for routing an email message over a network to a recipient mailbox server. The system may enable an email message to be transmitted over a network through a plurality of proxy and store-and-forward transport servers to a destination recipient mailbox. An external message transfer agent may receive SMTP commands for an email message and may transmit the received email message to a proxy transport server. The proxy transport server may be an intermediary server which may perform basic email processing and security tasks without persisting the email message. The proxy transport server may apply a selection process for optimally selecting a store-and-forward (SAF) transport server to which to route the email message. The selection process may instruct the proxy transport server to identify available SAF transport servers, organize the SAF transport servers into server groups, and select the optimal SAF transport server belonging to a server group where at least one of the recipient mailbox servers is located. The proxy transport server may transmit the email message to the selected SAF transport server for delivering the message to the recipient mailbox server located within the server group. The SAF transport server may additionally connect to other SAF transport servers belonging to other server groups where one or more of the recipient mailbox servers are additionally located.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for optimally selecting a store-and-forward transport server for routing an email message over a network to a recipient mailbox server. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates a system for email routing over a network, according to embodiments. In a networked environment, as demonstrated in diagram 100, an email message 102 may be transmitted over a network 104 to its destination at a recipient mailbox server 124 via one or more network servers. In a system according to embodiments, the email message 102 sent from a sender client may be received by an external mail transport agent (MTA) 108 associated with a server 106 on the network 104 using Simple Mail Transfer Protocol (SMTP). The external MTA 108 may be responsible for routing the incoming email message 102 from the sender client to its destination at one or more recipient mailbox servers 124. The email message 102 routing and transmission details may be specified by the Simple Mail Transfer Protocol (SMTP).

In an example embodiment, the external (MTA) 108 may not have visibility into the organization's/recipient's mailbox server and not know the difference between a mailbox server, a SAF transport server and a proxy server. (MTA) 108 may resolve the domain in domain name service (DNS) and obtain one or more IP addresses of mail servers for that domain. In some embodiments, the mail servers may be proxy transport servers. The (MTA) 108 expects the servers on those addresses to understand the standard SMTP protocol in order to route the email message 102 to the appropriate recipient mailbox server. In order to transmit the email message 102 to the recipient mailbox server, the external (MTA) 108 may route the email message 102 through a proxy transport server 110. The proxy transport server 110 may be an intermediary server responsible for receiving the email message 102 from the external MTA 108 and delivering the email message 102 to the recipient mailbox server. In an example embodiment, the proxy transport server 110 may be configured to perform basic processing tasks and quick security functions to reduce threats and spam which may be contained in the email message 102 such as source IP blocking, recipient filtering, and transport layer security (TLS) termination, before transmitting the email message 102 to the recipient mailbox server 124.

In a further embodiment, the proxy transport server 110 may be configured to select a store-and-forward (SAF) transport server 118 which may serve as another intermediary server for transmitting the email message 102 to the recipient mailbox server 124. The SAF transport server 118 may be configured to receive the email message 102 from the proxy transport server 110, store the email message 102, and deliver the email message 102 to the recipient mailbox server 124. The SAF transport server 118 may persist the email message 102 while in transit, at least for the duration of the message processing. Because the SAF transport server 118 persists the messages, the SAF transport server 118 may perform additional and more thorough tasks and security functions on the email message 102, such as expanding a distribution group associated with the email message 102 and scanning the content of the email message 102 for spam and viruses. The SAF transport server 118 may also be configured to temporarily store or queue the email message 102 when the recipient mailbox server 124 is unavailable to accept the email message 102, such as when the mailbox server is down, not connected to the internet, and/or not in a position to receive messages. When the recipient mailbox server 124 is reconnected and able to receive the email message 102, the SAF transport server 118 may forward the stored email message 102 to the recipient mailbox server 124 where the email message 102 may be stored long term.

In a system according to embodiments, one or more SAF transport servers 118, 126 may be available for the proxy transport server 110 to select for routing the email message 102 to one or more recipient mailbox servers 124, 130. Each available SAF transport server 118, 126 may belong to a server group 114, 116 which may also be associated with the one or more recipient mailbox servers 124, 130. The SAF transport server 118 belonging to a first server group 114 may be configured to communicate only with the recipient mailbox server 124 within the same first server group 114 as the SAF transport server 118. Additionally, the SAF transport server 118 in the first server group 114 may be configured to communicate with another SAF transport server 126 belonging to a second server group 116, but may not be able to communicate with a recipient mailbox server 130 belonging to a second server group 116.

Typically the proxy transport server 110 may select an SAF transport server 118 for routing an email message 102 to the recipient mailbox server 124 based on factors such as network connectivity and applying load balancing techniques, including a round robin technique and taking into account the number of connections and server costs and weights. The proxy transport server 110 may have a limited amount of time to select a working and connected SAF transport server 118 and to transmit 112 the message to the SAF transport server 118 before the external MTA 108 times out its connection. As a result the proxy transport server 110 may select an SAF server that is far away in proximity from the destination recipient mailbox server 124, which may not be an optimal selection for quickly and efficiently routing the email message 102 to the destination recipient mailbox server 124.

For example, the proxy transport server 110 may randomly select an SAF transport server 118 belonging to a first server group 114 as the intermediary transport server, and the destination recipient mailbox server may belong to a different second server group 116. In order to route the email message 102 to its destination at the recipient mailbox server 130 in the second server group 116, the selected SAF transport server 118 in the first server group 114 may have to fork the email message 102 and transmit 122 the email message 102 from the first server group 114 to the second SAF transport server 126 in the second server group 116, where the second SAF transport server 126 may then transmit 128 the email message 102 to the recipient mailbox server 130 belonging to the second server group 116. The extra steps in transmitting the email message 102 from the proxy transport server 110 to the recipient mailbox server based on the selected SAF transport server may delay the receipt of the email message 102 by the recipient mailbox server. Optimal routing may not be achieved when the selected SAF transport server belongs to a server group that is far away from the server group where the destination recipient mailbox server is located.

In a system according to embodiments, the proxy transport server 110 may be configured to optimally select an SAF transport server for achieving optimal routing to the recipient mailbox server. The proxy transport server 110 may identify a prioritized list of candidate SAF transport servers based on the recipient information designated by the email message 102, the recipient mailbox server locations, SAF server locations, and server versions, for selecting an optimal SAF transport server for transmitting the email message 102 to its recipient mailbox server. The optimal SAF transport server may belong to a server group where at least one of the recipient mailbox servers designated by the email message 102 is located in order to avoid unnecessary extra hops between server groups and to avoid a time delay and dropped connectivity.

A typical email message routing scenario may be demonstrated in diagram 100. The external MTA 108 may connect to the proxy transport server 110 by resolving the domain portion of the one or more recipients' email addresses associated with the email message 102 and connecting to the IP address associated with the domain name. The selected proxy transport server 110 may select an SAF transport server 118 to which to transmit the email message 102. In order to select the optimal SAF transport server 118, the proxy transport server 110 may identify the recipient mailbox servers of the email message 102, and may determine that a first recipient mailbox server 124 is located within a first server group with a first SAF transport server 118, and a second recipient mailbox server 130 is located with a second server group 116 with a second SAF transport server. The proxy transport server 110 may optimally select the SAF transport server 118 for routing the email message 102 directly to the recipient mailbox server 124, and may establish a session with selected SAF transport server 118 to transmit 112 the email message 102 to the selected SAF transport server 118. The SAF transport server 118 may persist the email message 102 and perform security tasks before acknowledging receipt of the email message 102 to the proxy transport server 110, which in turn acknowledges receipt of the email message 102 to the external MTA 108.

The SAF transport server 118 may directly transmit 120 the email message 102 to the recipient mailbox server 124 located within the same first server group 114 as the selected SAF transport server 118. In order to transmit the email message 102 to an additional recipient mailbox server 130 located within a second server group 116, the SAF transport server 118 may also fork and transmit 122 the email message 102 to a second SAF transport server 126 associated with the second server group 116. The second SAF server 126 may then directly transmit 128 the email message 102 to the second recipient mailbox server 130.

Figure 2:
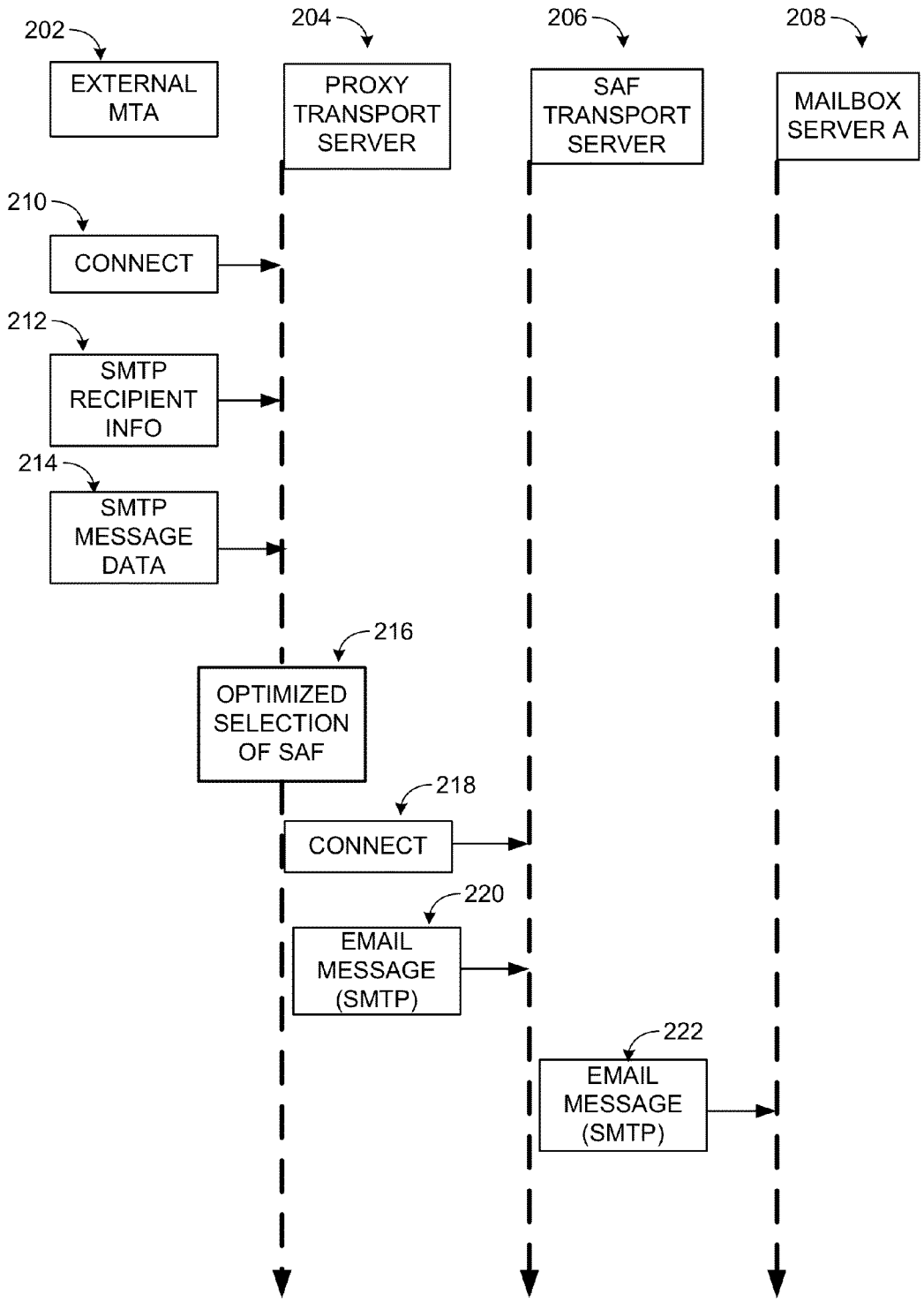
FIG. 2 illustrates an example email routing scenario optimally selecting an store-and-forward transport server for routing an email message to a recipient mailbox server.

FIG. 2 illustrates an example email routing scenario optimally selecting an store-and-forward transport server for routing an email message to a recipient mailbox server, according to embodiments. As described above in conjunction with FIG. 1, the proxy transport server 204 may optimally select a store-and-forward (SAF) transport server 206 for transmitting an email message to a recipient mailbox server 208. The proxy transport server 204 may select a single SAF transport server 206 for routing the email message to, regardless of the number of recipients associated with the email message. Selecting a single SAF transport server 206 may also enable thorough tasks such as distribution group expansion, adding a disclaimer, etc., to be performed on the email message only one time before forking the email message for transmission to the recipient mailbox servers.

In a system according to embodiments, as demonstrated in diagram 200, the proxy transport server 204 may utilize recipient information of an email message, and specifically the recipient mailbox server locations for selecting the optimal SAF transport server 206. The optimal SAF transport server 206 may belong to a server group where at least one of the email message recipient mailbox servers is located in order to avoid unnecessary extra hops between server groups and to avoid a time delay and dropped connectivity. The proxy transport server 204 may be connected 210 with the external mail transport agent 202 in order to receive SMTP commands containing recipient information 212 and other information such as message headers and content data 214 for a received email message. In order to utilize the recipient information for selecting the SAF transport server 206, the proxy transport server 204 may wait until it has received all of the SMTP commands containing the recipient information 212 of the email message (e.g. "RCPT TO:" SMTP commands) from the external MTA 202 before beginning selection of an SAF transport server 206. Additionally, the proxy transport server 204 may utilize headers associated with the email message for selecting the SAF transport server 206, and the proxy transport server 204 may wait until all of the SMTP commands containing the message header information and content data 214 are received (e.g. DATA/BDAT SMTP commands).

As further demonstrated in diagram 200, the proxy transport server 204 may optimally select 216 the SAF transport server after all of the SMTP commands for the recipient information 212 and the message header and content data 214 information have been received. While the proxy transport server performs steps to optimally select 216 the optimal SAF transport server 206, the proxy transport server 204 may maintain an active connection with the external MTA 202. The active connection with the external MTA 202 provides a limited amount of time for the proxy transport server 204 to select and establish a successful connection 218 with the selected SAF transport server 206 before the external MTA 202 times out and drops the connection with the proxy transport server 204. Besides selecting and establishing a connection, the proxy server may also transmit the information that it has already received—e.g. the sender/recipients information. Also, establishing a connection may require TLS negotiation and authentication potentially resulting in a timeout problem. The proxy transport server 204 may be able to efficiently select an optimal SAF transport server 206 and minimize the failed connection attempts with a SAF transport server 206, by taking into account selection parameters such as a maximum number of candidate SAF transport servers and a maximum number of candidate SAF transport servers in remote sites. The proxy transport server 204 may transmit 220 the email message to the selected SAF transport server 206, which may then transmit 222 the email message to its recipient mailbox server 208.

Figure 3:
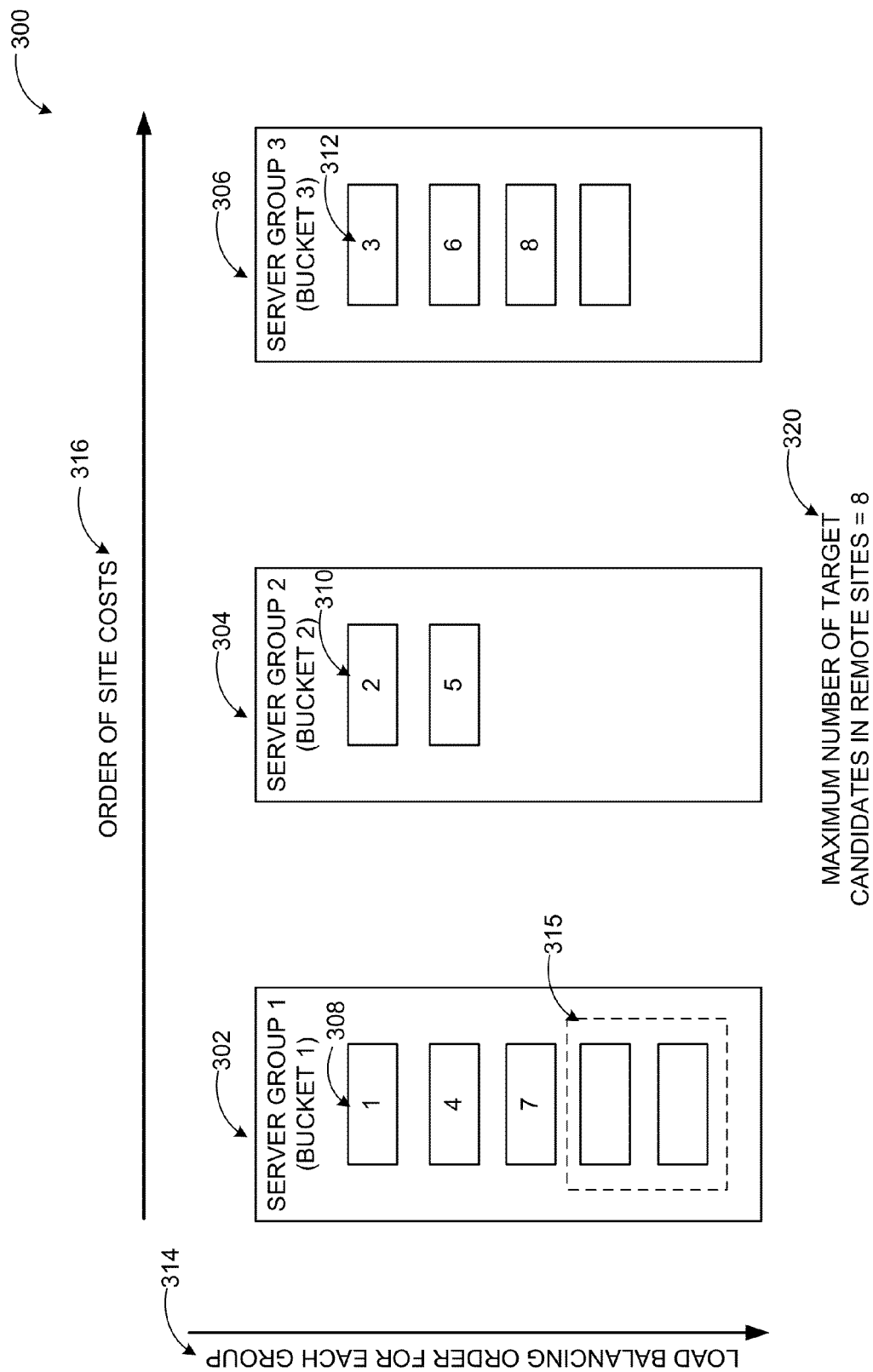
FIG. 3 illustrates optimal selection of SAF transport servers from local and remote sites, according to embodiments.

FIG. 3 illustrates an adaptive selection of SAF transport servers from local and remote sites, according to embodiments. According to some embodiments, a maximum number of target candidates in remote sites parameter 320 may be set to zero to force "local site only" behavior. Assuming that the parameter is non-zero, then the remote site servers may be preferred over local-site servers in case of "redundant storage" use case, but that can also be made configurable. The regular proxying may be more successful by selecting the closest possible target server. As shown in diagram 300, an algorithm according to embodiments may be adjusted to use the parameter by obtaining all SAF transport servers 308, 310, and 312 that are allowed to store redundant copies of messages for the current server. Next, the SAF servers 308, 310, and 312 may be bucketized in groups 302, 304, and 306 according to the sites they belong.

The proxy target selection algorithm may include following steps: (1) Select up-to-maximum servers from the local site if any recipient server groups contain local site servers; (2) Select up-to-max-remote-site servers as indicated in diagram 300; and (3) Top off the selection (if there is room) with fallback servers in the local site.

The servers may be ordered within each bucket or group individually based on load-balancing data (314). In other embodiments, the servers may be ordered in an alternating order. The groups may be ordered according to site costs (316). Among the buckets of servers from remote sites, up to the maximum number of target candidates in remote sites servers may be selected by iterating repeatedly over all the buckets and taking one server from each bucket (in the load-balanced order 314) in every iteration.

The emphasis on alternating servers from different sites (even if the site costs are different) may assist in dealing with site-wide outages (e.g. network outage for a given site), where the system would not try to connect to two servers from the same site in a row if there are other candidates. Optionally, the buckets of servers from remote sites may be ordered by the site costs. Any servers (315) known to be unavailable/unresponsive recently may be excluded.

In another embodiment, the process for optimally selecting the SAF transport server may begin by randomizing the order of all of the recipients of the email message, in order to ensure that the external MTA does not control the selection of the SAF transport servers. The proxy transport server may randomly select an anchor recipient mailbox server belonging to the server group that contains the candidate SAF transport server in closest site proximity to the proxy transport server. After selection of the anchor recipient mailbox server, the proxy transport server may identify all of the candidate SAF transport servers in the server group where the anchor recipient mailbox server is located. The proxy transport server may then perform the selection steps of categorizing the candidate SAF transport servers in the local and remote sites according to load balancing data, and applying the selection parameter to select up to a maximum number of candidate SAF transport servers of the SAF transport servers in the local and remote sites in the load-balanced order, as previously described.

In other embodiments other selection steps may be applied, such as assigning the candidate SAF transport servers of the SAF transport servers different weights based on the software version and other criteria. The weights may be utilized for prioritizing and ordering the candidate SAF transport servers in the local and remote sites and for excluding certain servers from consideration.

In a further embodiment, an adaptation of the target selection process to prioritize for redundancy and failure resiliency may also optimally select a candidate SAF transport server on which to store a redundant copy of an email message. During email message processing (SAF servers may store/queue message for a significant time while the processing is taking place or while the target mailbox server is unavailable), individual SAF transport servers may experience hardware and/or software failures that may result in loss of data stored on the server. In order to prevent permanent loss of email message data due to failure of the single SAF transport server, a redundant copy of the email message may be created and stored on one or more SAF transport servers. Storing a redundant copy of an email message may require a first SAF transport server storing the email message to copy the email message and transmit it to a second SAF transport server for storage on the second SAF transport server. The first SAF transport server may apply an adapted selection process as described above for selecting the optimal SAF transport server for storing the redundant copy of the email message, with some additional configurations and selection parameters. For example, a configuration or parameter specify that any SAF transport server on any local or remote site may store the redundant copy, or alternatively, only SAF transport servers located within the same server group as the first/original SAF transport server may store the redundant copy of the email message.

In further embodiments, additional parameters for specifying where a redundant copy of an email message may be considered when selecting the optimal SAF transport server. Some additional parameters may include for example, specifying that the redundant copy of an email message has to be stored on an SAF transport server in a remote site for achieving site resilience, that the redundant copy of an email message has to be stored on an SAF transport server in the local site, and/or that the redundant copy of an email message may be preferably stored on an SAF transport server in a remote site but may fall back to SAF transport servers in the local site if necessary. An example implementation of the above parameters in conjunction with the selection process may be achieved by establishing selection parameters such as for example, "maximum number of candidates in remote sites" and "maximum number of candidates in the local site." Setting either parameter to zero may force remote site only or local site only, and if both selection parameters are set to non-zero, then the default selection may be configured to prefer the remote site with the local site as the backup. The additional parameters for selecting an SAF transport server for storing the redundant email message copy may be configurable and customized by the system. The selection process as described above taking into account these additional parameters may be applied for selection of the second SAF transport server for storing the redundant copy of an email message.

The example systems in FIG. 1 through 3 have been described with specific configurations, applications, and interactions. Embodiments are not limited to systems according to these examples. A system for optimally selecting a store-and-forward transport server for routing an email message over a network to a recipient mailbox server may be implemented in configurations employing fewer or additional components and performing other tasks. Furthermore, specific protocols and/or interfaces may be implemented in a similar manner using the principles described herein.

Figure 4:
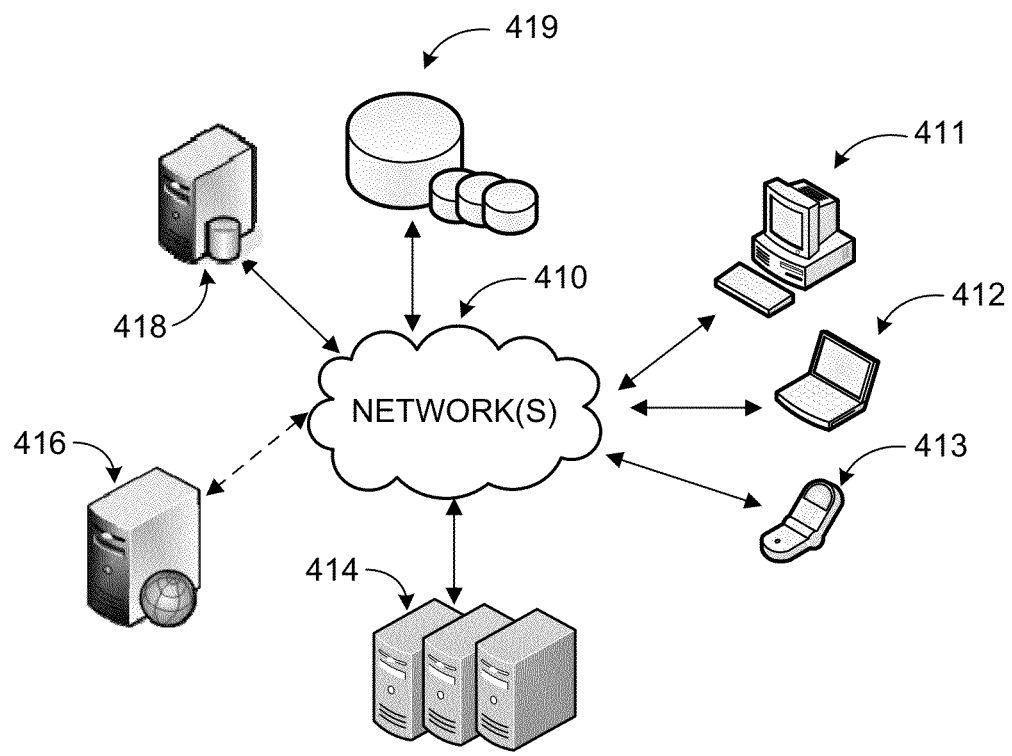
FIG. 4 is a networked environment, where a system according to embodiments may be implemented.

FIG. 4 is an example networked environment, where embodiments may be implemented. A system for optimally selecting a store-and-forward transport server for routing an email message over a network to a recipient mailbox server may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate optimally selecting a store-and-forward transport server for routing an email message over a network to a recipient mailbox server. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for optimally selecting a store-and-forward transport server for routing an email message over a network to a recipient mailbox server. Furthermore, the networked environments discussed in FIG. 4 are for illustration purposes only. Embodiments are not limited to the example applications, modules, or processes.

Figure 5:
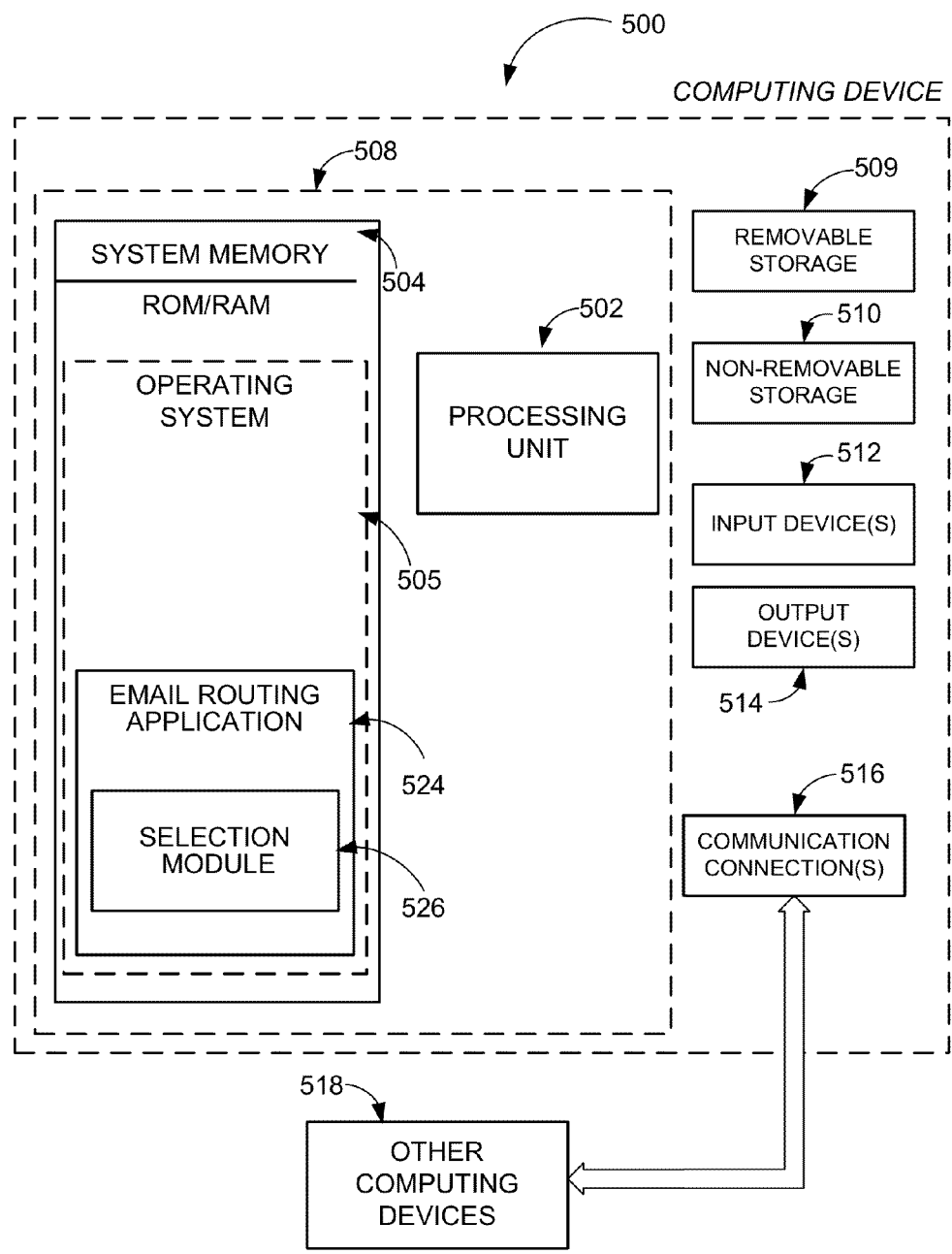
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for optimally selecting a store-and-forward transport server for routing an email message over a network to a recipient mailbox server according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as an email routing application 524 and a selection algorithm module 526.

The email routing application 524 may facilitate routing an email message from a sender client to a destination recipient mailbox server. The email routing application may enable the email message to be routed through a plurality of proxy and store-and-forward servers for transmitting the email from the sender client to its destination recipient mailbox server. Through the selection algorithm module 526, the email routing application may select an optimal store-and-forward transport server for routing the email message through in order to quickly and efficiently transmit the message to its destination recipient mailbox server while minimizing connection timeouts and dropped connections. Email routing application 524 and selection algorithm module 526 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
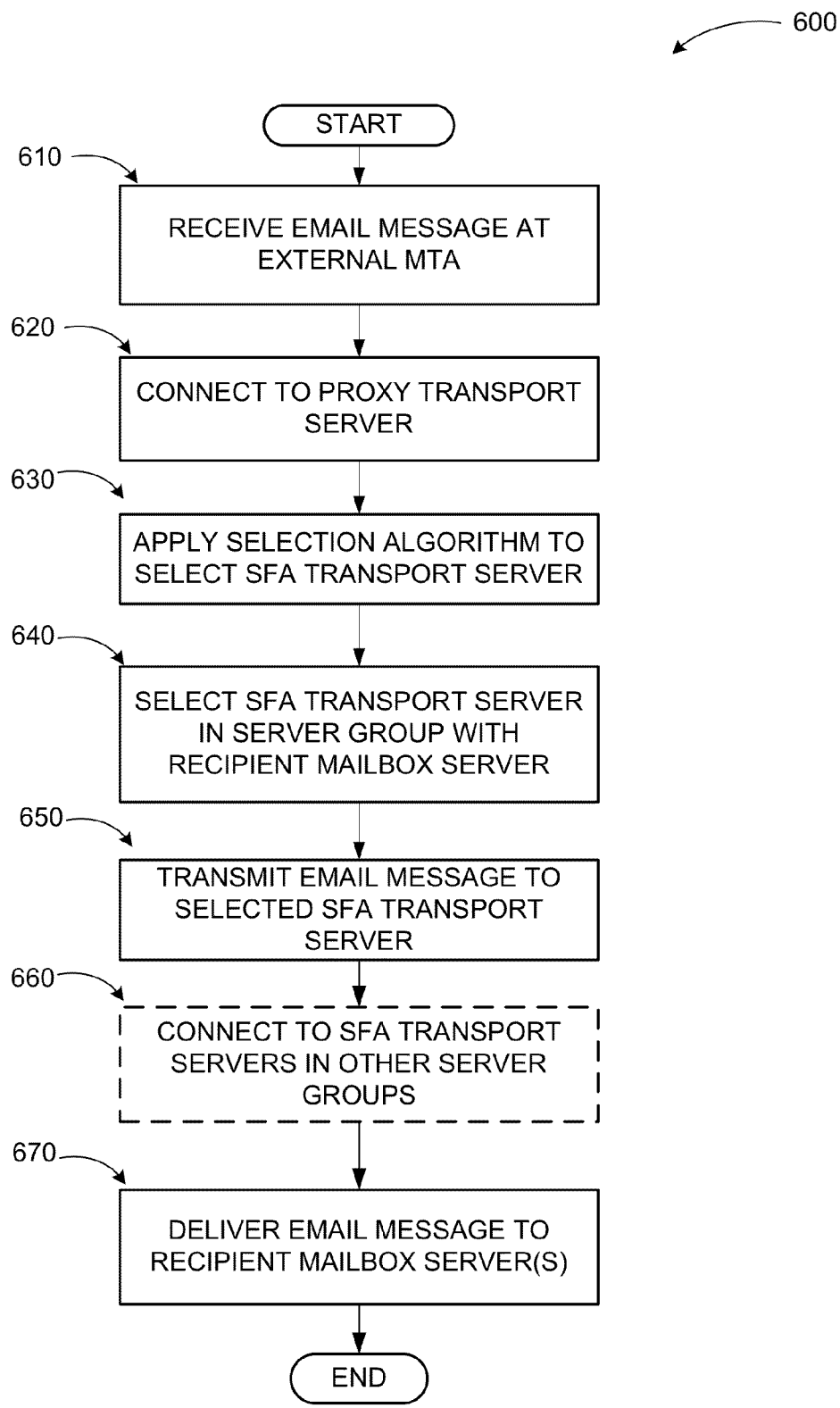
FIG. 6 illustrates a logic flow diagram for process 600 for optimally selecting a store-and-forward transport server for routing an email message over a network to a recipient mailbox server according to embodiments.

FIG. 6 illustrates a logic flow diagram for process 600 for optimally selecting a store-and-forward transport server for routing an email message over a network to a recipient mailbox server according to embodiments. Process 600 may be implemented on a computing device or similar electronic device capable of executing instructions through a processor.

Process 600 begins with operation 610, where the system may receive an email message at an external mail transfer agent (MTA) hosted on a network. The email message data may be received using SMTP commands. At operation 620, the external MTA may connect with a proxy transport server associated with the network. The proxy transport server may be an intermediary server which may perform basic email processing and security tasks without persisting the email message. At operation 630, the proxy transport server may apply a selection process to optimally select a store-and-forward (SAF) transport server to which to route the email message. The proxy transport server may wait to select the SAF transport server until all of the SMTP commands for the email message data have been received by the external MTA, and the proxy transport server may maintain its connection with the external MTA while applying the selection process.

At operation 640, in order to select the optimal SAF transport server, the proxy transport server may identify available SFA transport servers, organize the SFA transport servers into server groups associated with recipient mailbox servers designated by the email message, and may select an SFA transport server belonging to a server group where at least one of the recipient mailbox servers is located. At operation 650, the proxy transport server may transmit the email message to the optimally selected SAF transport server. At operation 660, the selected SAF transport server may optionally connect to other SAF transport servers belonging to other server groups where one or more of the recipient mailbox servers are additionally located. At operation 670, the selected SAF transport server may directly deliver the email message to the recipient mailbox server located in the same server group as the selected SAF transport server. The selected SAF transport server may also fork the email message and deliver the forked email message to the other SAF transport servers) located in other server groups associated with additional recipient mailbox servers, and the other SAF transport servers) may also directly deliver the forked email message to the recipient mailbox servers located in the other server group(s).

The operations included in process 600 are for illustration purposes. Optimally selecting a store-and-forward transport server for routing an email message over a network to a recipient mailbox server may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for routing an email message to a recipient mailbox server over a network environment, the method comprising:
    transmitting an email message received at an external mail transport agent (MTA) to a proxy transport server;
    identifying a store-and-forward (SAF) transport server associated with one or more recipient mailbox servers designated by the email message from one or more candidate SAF transport servers by applying one or more selection parameters for enabling the proxy transport server to select one of the candidate SAF transport servers for routing the email message to, wherein applying one or more selection parameters further comprises:
        if any of the candidate SAF transport servers are located in a site where the proxy transport server is located, applying a local site selection parameter; and
        if any of the candidate SAF transport servers are located in a remote site where the proxy transport server is not located, applying a remote site selection parameter;
    transmitting the email message from the proxy transport server to the identified SAF transport server;
    transmitting the email message to one or more recipients associated with the identified SAF transport server directly from the identified SAF transport server;
    identifying another SAF transport server associated with one or more other recipient mailbox servers designated by the email message; and
    transmitting the email message from the identified SAF transport server to the other identified SAF transport server for delivery to the one or more other recipients.

2. The method of claim 1, wherein the SAF transport server is identified by being in a same server group as the one or more recipient mailbox servers.

3. The method of claim 1, further comprising:
    identifying the proxy transport server using a domain name service (DNS).

4. The method of claim 1, wherein the SAF transport server persists the email message before acknowledging the email message's receipt to the proxy transport server.

5. The method of claim 1, wherein the proxy transport server acknowledges to the external MTA the email message's delivery to the SAF transport server.

6. The method of claim 1, wherein identifying the SAF transport server comprises:
    identifying one or more server groups where the one or more identified recipient mailbox servers are located;
    identifying one or more candidate SAF transport servers belonging to the one or more server groups;
    categorizing the one or more candidate SAF transport servers according to a site they belong to; and
    ordering the one or more candidate SAF transport servers according to load balancing data.

7. The method of claim 6, further comprising:
    if a local site selection parameter is applied, selecting up to a predefined number of candidate SAF transport servers in the local site in a load-balanced order and excluding any SAF transport servers known to be one of unavailable and unresponsive.

8. The method of claim 6, further comprising:
    if a remote site selection parameter is applied, selecting up to a predefined number of candidate SAF transport servers of the SAF transport servers in remote sites by iterating over the candidate SAF transport servers and selecting an SAF transport server in one of an alternating order and a load-balanced order during each iteration; and
    excluding any SAF transport servers known to be one of unavailable and unresponsive.

9. The method of claim 1, further comprising:
    delaying selecting a SAF transport server until all recipient information for the email message is received in SMTP commands by the proxy server.

10. The method of claim 1, further comprising:
    delaying selecting a SAF transport server until all message headers are received in SMTP commands by the external MTA.

11. The method of claim 1, further comprising:
maintaining an active connection between the external MTA and the proxy transport server while selecting the SAF transport server.

12. A computing device for routing an email message to a recipient mailbox server over a network environment, comprising:
a memory storing instructions;
a processor coupled to the memory, the processor executing an email routing application, wherein the email routing application is configured to:
transmit an email message to a proxy transport server;
identify a store-and-forward (SAF) transport server associated with one or more recipient mailbox servers designated by the email message by applying one or more selection parameters for enabling the proxy transport server to select among a plurality of candidate SAF transport servers for routing the email message to, wherein:
if any of the candidate SAF transport servers are located in a site where the proxy transport server is located, a local site selection parameter is applied; and
if any of the candidate SAF transport servers are located in a remote site where the proxy transport server is not located, a remote site selection parameter is applied;
transmit the email message from the proxy transport server to the identified SAF transport server;
persist the email message at the SAF transport server before acknowledging the email message's receipt to the proxy transport server;
transmit the email message to one or more recipients associated with the identified SAF transport server directly from the identified SAF transport server;
identify another SAF transport server associated with one or more other recipient mailbox servers designated by the email message; and
transmit the email message from the identified SAF transport server to the other identified SAF transport server for delivery to the one or more other recipients.

13. The computing device of claim 12, wherein the local site selection parameter is a maximum number of candidate SAF transport servers in the local site and the remote site selection parameter is a maximum number of candidate SAF transport servers in one or more remote sites.

14. The computing device claim 12, wherein the email routing application is further configured to:
randomize an order of recipients of the email message to prevent a control of the SAF transport server selection by the external MTA.

15. The computing device of claim 12, wherein the email routing application is further configured to:
maintain a fallback group of candidate SAF transport servers located in the local site ordered according to a load balancing data for enabling the proxy transport server to select additional candidate SAF transport servers if a number of selected SAF transport servers from the local site and the remote sites is less than the number of candidate SAF transport servers as defined by the local and remote selection parameters.

16. A computer-readable memory device with instructions stored thereon for routing an email message to a recipient mailbox server over a network environment, the instructions comprising:
identifying a proxy transport server associated with a received email message using a domain name service (DNS);
transmitting the email message to a proxy transport server;
identifying one or more candidate store-and-forward (SAF) transport servers belonging to one or more server groups where one or more identified recipient mailbox servers are located by applying one or more selection parameters for enabling the proxy transport server to select one of the candidate SAF transport servers for routing the email message to, wherein applying one or more selection parameters further comprises:
if any of the candidate SAF transport servers are located in a site where the proxy transport server is located, applying a local site selection parameter; and
if any of the candidate SAF transport servers are located in a remote site where the proxy transport server is not located, applying a remote site selection parameter;
categorizing the one or more candidate SAF transport servers into groups according to a site they belong to, wherein the site comprises one of: a local site and a remote site;
ordering the one or more candidate SAF transport servers in the groups based on selecting a local site server first followed by remote site servers in an alternating order relative to remote sites associated with the remote site servers;
transmitting the email message from the proxy transport server to one of the identified candidate SAF transport servers;
transmitting the email message to one or more recipients associated with the SAF transport server receiving the email message;
identifying another candidate SAF transport server associated with one or more other recipient mailbox servers designated by the email message; and
transmitting the email message from the SAF transport server receiving the email message to the other identified candidate SAF transport server for delivery to the one or more other recipients.

17. The computer-readable memory device of claim 16, wherein the instructions further comprise:
enabling a first SAF transport server to create a redundant copy of the email message; and applying additional selection parameters to select a second SAF transport server for storing the redundant copy of the email message.

18. The computer-readable memory device of claim 16, wherein the instructions further comprise:
selecting one anchor recipient whose mailbox server belongs to a server group that includes a closest SAF transport server based on site proximity.

* * * * *